United States Patent
Sakaguchi et al.

(10) Patent No.: US 6,675,831 B2
(45) Date of Patent: Jan. 13, 2004

(54) HIGH-PRESSURE TANK APPARATUS

(75) Inventors: Teppei Sakaguchi, Osaka (JP); Yoshiki Sakaguchi, Carson, CA (US); Shaun C. Hogan, Brigham City, UT (US); Kaoru Nomichi, Hyogo (JP); Seiji Ishii, Hyogo (JP); Takehiko Saeki, Hyogo (JP)

(73) Assignees: SamTech Corporation, Kashiwara (JP); SamTech International, Inc., Carson, CA (US); Hypercomp Engineering Inc., Brigham City, UT (US); Kabushiki Kaisha Kawasaki Precision Machinery, Hyogo (JP)

( * ) Notice: Subject to any disclaimer, the term of this patent is extended or adjusted under 35 U.S.C. 154(b) by 0 days.

(21) Appl. No.: 10/246,640

(22) Filed: Sep. 19, 2002

(65) Prior Publication Data

US 2003/0066836 A1 Apr. 10, 2003

(30) Foreign Application Priority Data

Sep. 19, 2001 (JP) .......................................... 2001-284381

(51) Int. Cl.⁷ .............................. F17C 13/04; F17C 1/04; F17C 1/14
(52) U.S. Cl. .................................... 137/613; 137/505.25
(58) Field of Search ............................. 137/613, 505.25

(56) References Cited

U.S. PATENT DOCUMENTS

| | | | | |
|---|---|---|---|---|
| 2,371,218 A | * | 3/1945 | Boynton | 137/505.25 X |
| 2,989,067 A | * | 6/1961 | Perle | 137/613 |
| 3,511,266 A | * | 5/1970 | Phlipot | 137/505.25 X |
| 6,041,762 A | * | 3/2000 | Sirosh et al. | 137/505.25 X |
| 6,186,168 B1 | * | 2/2001 | Schultz et al. | 137/505.25 X |
| 6,431,197 B2 | * | 8/2002 | Hintzman et al. | 137/613 X |

* cited by examiner

*Primary Examiner*—Kevin Lee
(74) *Attorney, Agent, or Firm*—Nixon Peabody, LLP

(57) ABSTRACT

To downsize a high-pressure tank apparatus comprising: a high-pressure tank in which high-pressure gas is charged; and a valve mechanism including a regulator valve for reducing the gas pressure in the tank, to prevent damage to the valve mechanism, and to facilitate the handling of the valve mechanism and the like, the valve mechanism is provided at a gas outlet of the high-pressure tank to locate inside of the tank. The valve mechanism includes a capsule fixedly attached to the gas outlet in a gas-tight manner to face the inside of the high-pressure tank. Within the capsule, a shut-off valve for providing and interrupting communication between the inside and outside of the tank by its opening and closing, respectively, and a regulator valve for reducing the pressure of the high-pressure gas in the tank are disposed.

7 Claims, 2 Drawing Sheets

HIGH-PRESSURE TANK APPARATUS

BACKGROUND OF THE INVENTION (1) Field of the Invention

This invention relates to high-pressure tank apparatuses in which high-pressure gas charged in a high-pressure tank is taken out thereof following pressure reduction by a reducing valve, and particularly relates to arrangements of the reducing valve.

(2) Background Art

There are known conventional high-pressure tanks in which gas, such as hydrogen gas or natural gas, is charged and stored at a high pressure of 7 MPa to 75 MPa. Since the gas in such a tank is at a high pressure, the high-pressure gas is reduced in pressure by a reducing valve in order to be at a low pressure for use. The reducing valve is connected to a shut-off valve in series to form a valve mechanism. The valve mechanism, having both the valves, is generally attached externally to the high-pressure tank in a manner to be connected to a gas outlet of the tank.

However, if the valve mechanism is placed externally of the tank, a tank apparatus constructed by combining the tank with the valve mechanism is inevitably great in size as a whole, and there is a limit to its downsizing.

Furthermore, since the valve mechanism is placed externally of the tank, it is easy to hit on nearby things and may be thereby damaged, for example, when carried somewhere. The damage may cause the high-pressure gas to blow out of the tank.

Moreover, the above structure requires to connect the tank to the valve mechanism via high-pressure piping. This involves seals at the connecting points of the high-pressure piping and the like in order to prevent the leakage of high-pressure gas therefrom. In consideration of such a sealing structure against high pressure, close attention must be paid to the handling of the valve mechanism, the high-pressure piping and the like.

Therefore, an object of the present invention is to improve the arrangement of the valve mechanism including a reducing valve for reducing gas pressure in the high-pressure tank as described above to thereby downsize the tank apparatus as a combination of the tank and the valve mechanism, prevent damage to the valve mechanism and facilitate the handling of the valve mechanism and the like.

SUMMARY OF THE INVENTION

To attain the above object, in the present invention, the valve mechanism is of a built-in type in which the valve mechanism is accommodated in the high-pressure tank.

Specifically, according to the present invention, a high-pressure tank apparatus comprises a high-pressure tank in which high-pressure gas is charged, and a valve mechanism provided at a gas outlet of the high-pressure tank to locate inside of the tank. Furthermore, the valve mechanism comprises a shut-off valve for providing and interrupting communication between the inside and outside of the tank by its opening and closing, respectively, and a reducing valve connected to the shut-off valve in series for reducing the pressure of the high-pressure gas in the tank.

With the above arrangement, when the shut-off valve of the valve mechanism is opened, the inside of the high-pressure tank is communicated with the outside, the high-pressure gas charged in the tank flows through the reducing valve series-connected to the shut-off valve, the high-pressure gas is pressure reduced to a low pressure by the reducing valve, and the resultant low-pressure gas is then discharged to the outside of the tank.

In this case, the valve mechanism is of an in-tank structure in which it is provided at the gas outlet of the high-pressure tank to locate inside of the tank. Therefore, the tank apparatus as a combination of the high-pressure tank and the valve mechanism has the same size as the high-pressure tank itself, resulting in a downsized tank apparatus.

Furthermore, since the valve mechanism is located inside of the high-pressure tank, it can be protected by the high-pressure tank. This prevents the valve mechanism from hitting on nearby things and thereby being damaged when the high-pressure tank is carried somewhere or at other time.

Moreover, low-pressure gas obtained as the result of pressure reduction through the valve mechanism in the high-pressure tank is taken out from the high-pressure tank. This eliminates the need for such a sealing structure against high pressure provided externally of the tank as required when high-pressure gas is taken out from the high-pressure tank as it is, and reduced in pressure, thereby enhancing the handleability of the valve mechanism and the like.

The valve mechanism preferably has a structure which includes a capsule fixedly attached to the gas outlet in a gas-tight manner to face the inside of the high-pressure tank and in which the shut-off valve and the reducing valve are arranged within the capsule. With this structure, the capsule can accommodate the shut-off valve and the reducing valve with its inner space put under an atmospheric pressure like the outside of the tank. This facilitates the arrangement of these valves.

Furthermore, the high-pressure tank preferably includes a tank body made of aluminium or resin, and a covering member for covering the outer periphery of the tank body for reinforcement. With this structure, a light and compact high-pressure tank apparatus can be obtained.

Moreover, the gas pressure in the high-pressure tank is preferably set at 7 MPa to 75 MPa. In this manner, there can be obtained an optimal high-pressure tank which effectively exhibits the effects of the invention.

Moreover, the gas is preferably hydrogen gas or natural gas. Thus, a suitable gas can be obtained.

PREFERRED EMBODIMENT

Figure 1:
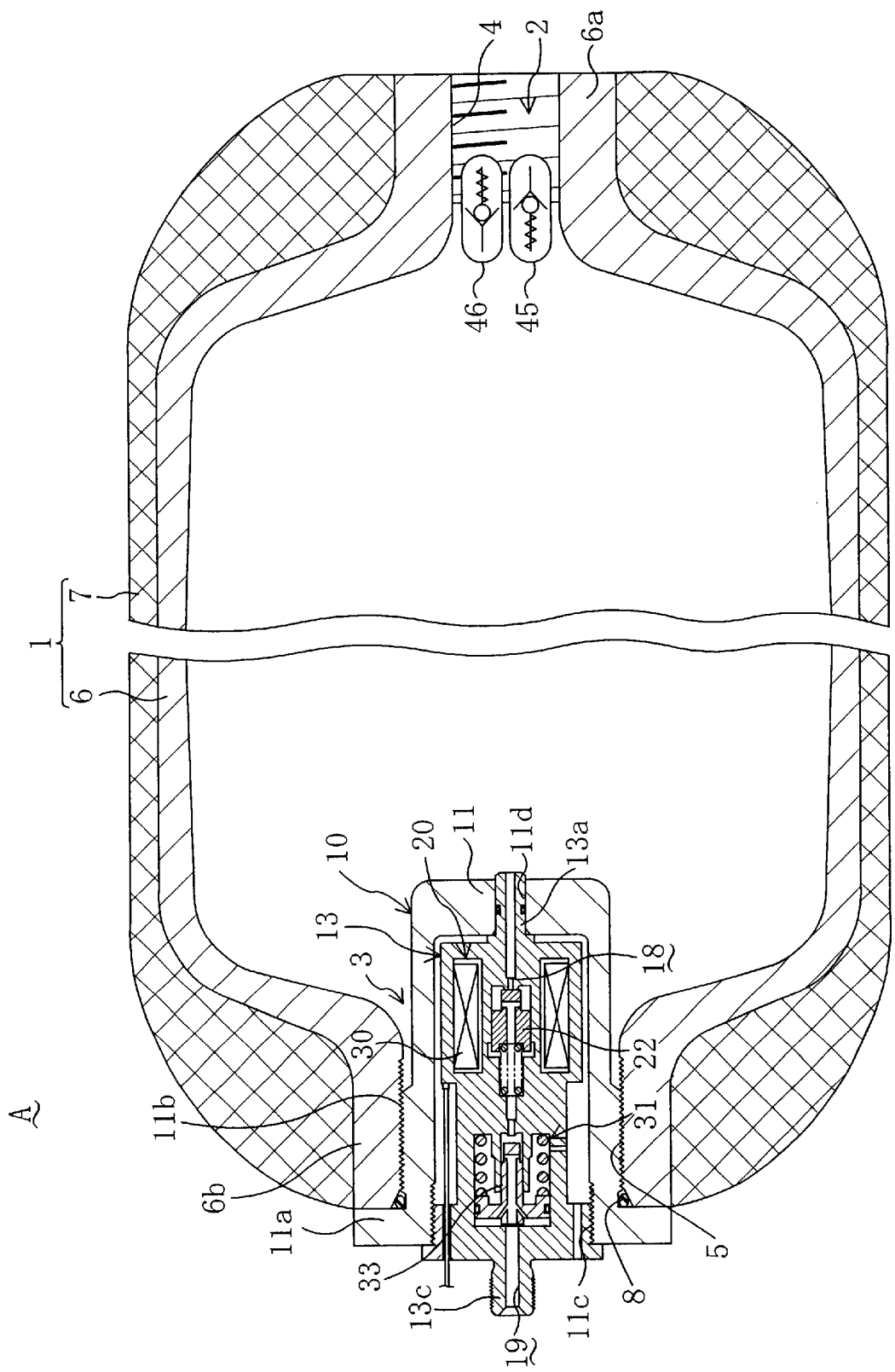
FIG. 1 is a cross-sectional view showing the entire structure of a tank apparatus according to an embodiment of the present invention.

Hereinafter, an embodiment of the present invention will be described with reference to the drawings. FIG. 1 shows the entire structure of a high-pressure tank apparatus A according to the embodiment of the present invention. This high-pressure tank apparatus A stores gas for use in various applications, such as various kinds of factories, offices, home and vehicles, at a high pressure (for example, 7 MPa to 75 MPa), reduces the high-pressure gas to a predetermined pressure (for example, 1 MPa) for the purpose of use and then supplies the gas. Examples of the gas include hydrogen gas, natural gas, oxygen gas and air. Naturally, gasses other than the foregoing can also be used.

In FIG. 1, 1 denotes a high-pressure tank substantially in the shape of a closed cylinder. A gas inlet 2 is opened at an end of the high-pressure tank 1 in the lengthwise direction thereof (in the horizontal direction of FIG. 1), while a gas outlet 3 is opened at the other end. The inner peripheries of the gas inlet 2 and the gas outlet 3 are provided with mounting threads 4 and 5, respectively. Inside of the high-pressure tank 1, high-pressure gas, for example, at 7 MPa to 75 MPa, is charged.

The high-pressure tank 1 includes a tank body 6 (forming a liner), and a covering member 7 for covering the outer periphery of the tank body 6 for reinforcement. The tank body 6 is made of aluminium alloy such as JIS A6061-T6, and is plastically formed from a cylindrical material to include an inlet side cylindrical portion 6a in which the gas inlet 2 is open, and an outlet side cylindrical portion 6b in which the gas outlet 3 is open. On the other hand, the covering member 7 is formed by winding carbon fibers around the outer periphery of the tank body 6 in multiple layers, and the thickness of portions thereof around the cylindrical portions 6a and 6b is set to be thicker than the other portions. The tank body 6 may be made of materials other than aluminium, for example, resin.

At the gas outlet 3 of the high-pressure tank 1, a valve mechanism 10 is disposed to locate inside of the tank 1. Specifically, the valve mechanism 10 includes a bottomed, cylindrical capsule 11 one end of which is open, and the capsule 11 includes a flange 11a extending radially outwardly from its open end. A male thread 11b is formed in a portion of the outer periphery of the capsule 11 close to the flange 11a. The male thread 11b is screwed with the mounting thread 5 in the inner periphery of the gas outlet 3 of the tank 1 to bring the flange 11a into abutment on the end surface of the outlet side cylindrical portion 6b of the tank body 6. In this manner, the capsule 11 is fixedly attached to the gas outlet 3 of the tank 1 to close the gas outlet 3 in a gastight manner and face the bottom side thereof to the inner space of the high-pressure tank 1. 8 denotes a seal member disposed between a portion of the capsule 11 located between the flange 11a and the thread 11b and the open end of the gas outlet 3 of the high-pressure tank 1. Furthermore, a female thread 11c is formed at the open end of the inner periphery of the capsule 11, and a fitting hole 11d is formed through the middle portion of the bottom wall of the capsule 11.

Furthermore, in the capsule 11, series-disposed are: a shut-off valve 20 of an on-off solenoid valve, which is located inside and at the bottom side of the capsule 11 (on the tank 1 inner side), for providing and interrupting communication between the inside and outside of the tank 1 by its opening and closing, respectively; and a regulator valve 31 (reducing valve), which is connected to the shut-off valve 20 in series and located inside and at the opening side of the capsule 11, for reducing the pressure of the high-pressure gas in the tank 1.

Figure 2:
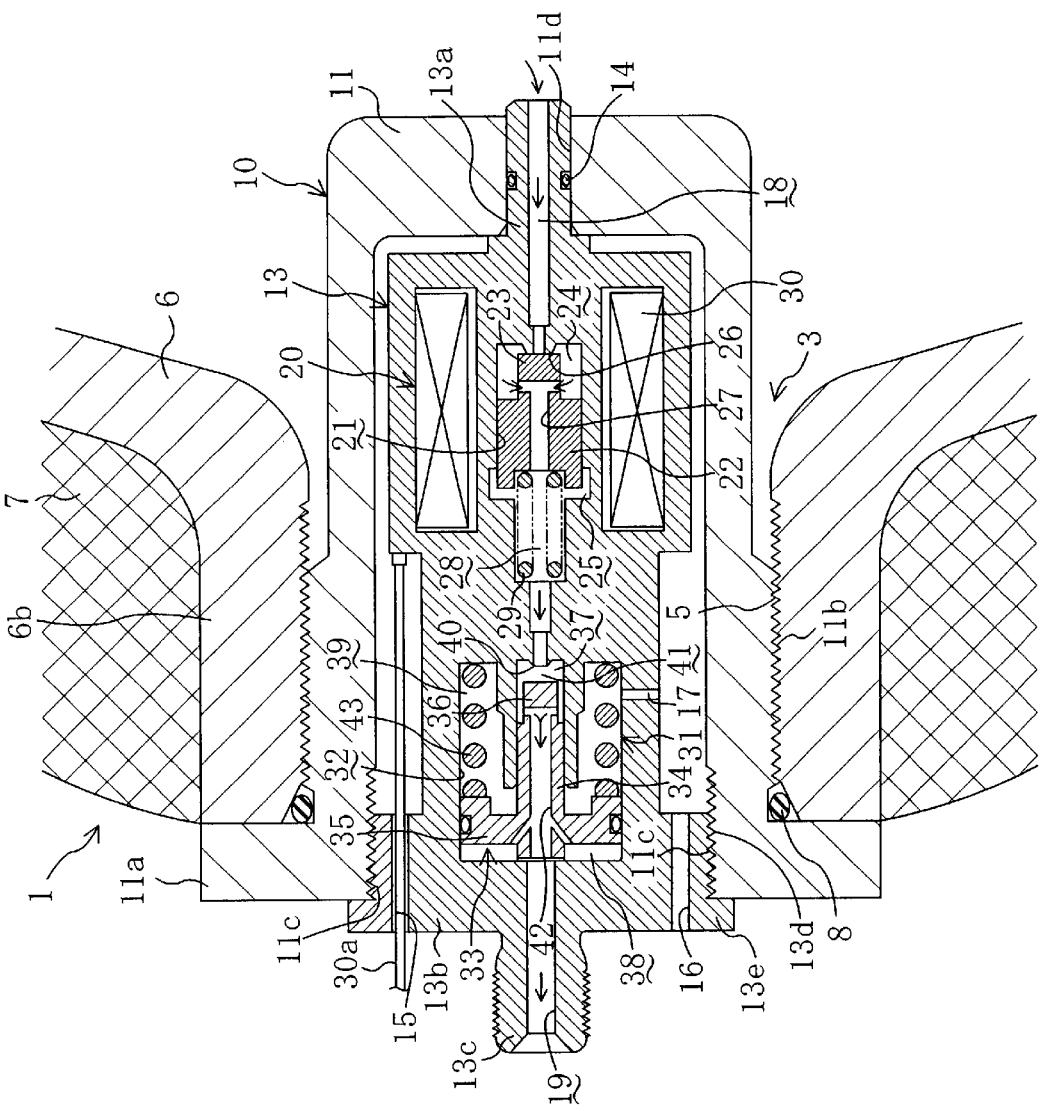
FIG. 2 is an enlarged cross-sectional view of a valve mechanism.

As shown in enlarged manner in FIG. 2, the shut-off valve 20 and the regulator valve 31 are provided with a common cylindrical valve case 13. At the bottom side end of the valve case 13 located at the bottom wall side of the capsule 11 (at the right-side end thereof in FIG. 2), an insert part 13a is formed which is inserted in the fitting hole 11d in the bottom wall of the capsule 11. The top end of the insert part 13a extends from the bottom wall of the capsule 11 outwardly, i.e., to the inner space of the tank 1. Furthermore, in the outer periphery of the insert part 13a, a seal member 14 is fitted for sealing between the outer periphery of the insert part 13a and the inner periphery of the fitting hole lid. The bottom side end of the valve case 13 is thereby held concentrically and detachably in the bottom wall of the capsule 11 while the seal member 14 provides a gas-tight seal between the insert part 13a and the fitting hole 11d.

On the other hand, at the opening side end of the valve case 13 located at the opening side of the capsule 11 (at the left-side end thereof in FIG. 2), a flange 13b for closing the opening of the capsule 11 is formed on the outer periphery of the valve case 13, and a pipe attachment part 13c is formed for attaching a low-pressure gas pipe (not shown) to the high-pressure gas tank apparatus A. The outer periphery of the flange 13b is formed with: a male thread 13d that is screwed with the female thread 11c formed at the opening end of the capsule 11; and a shoulder 13e that continues from the male thread 13d toward the outside and has a larger diameter than the portion having the male thread 13d. When the male thread 13d is screwed with the female thread 11c of the capsule 11 and the shoulder 13e abuts on the opening end surface of the capsule 11, the opening side end of the valve case 13 is held concentrically and detachably in the opening of the capsule 11.

Furthermore, formed through the flange 13b of the valve case 13 are: a wiring insert hole 15 in which a wiring 30a for conducting electricity to a below-described solenoid coil 30 of the shut-off valve 20 is inserted; and an open-to-air hole 16 for communicating with the outside a space in the capsule 11 which is defined by the valve case 13 and the capsule 11. The inner space of the capsule 11 is put under an atmospheric pressure through the open-to-air hole 16.

On the axis of the valve case 13, formed through the valve case 13 are: a high-pressure gas passage 18 through which high-pressure gas in the tank 1 flows; and a low-pressure gas passage 19 which is connected to the downstream end of the high-pressure gas passage 18 via the regulator valve 31 and through which low-pressure gas flows. The upstream end of the high-pressure gas passage 18 is open in the end surface of the insert part 13a to face the inner space of the tank 1. On the other hand, the downstream end of the low-pressure gas passage 19 is open in the end surface of the pipe attachment part 13c.

The shut-off valve 20 includes a plunger accommodating space 21 located inside of the valve case 13 and close to the bottom wall of the capsule 11. In the plunger accommodating space 21, a plunger 22 is fitted for reciprocal motion as a valve body for opening and closing the high-pressure gas passage 18. This plunger 22 divides the plunger accommodating space 21 into two rooms: an upstream room 24 and a downstream room 25.

Furthermore, on the side surface of the upstream room 24 closer to the capsule 11 bottom wall (on the tank 1 inner side), a valve seat 26 is formed in which is open a portion of the high-pressure gas passage 18 located upstream of the shut-off valve 20. On the other hand, a portion of the plunger 22 presented to the upstream room 24 and located on the capsule 11 bottom wall side is formed into a valve element 23 having a smaller diameter than the other portions. When the end surface of the valve element 23 is caused to abut on the valve seat 26, the shut-off valve 20 is opened.

The middle portion of the plunger 22 is formed with a communicating passage 27 (part of the high-pressure gas passage 18) for providing communication between the upstream and downstream rooms 24 and 25. The upstream end of the communicating passage 27 is open in the outer periphery of the valve element 23 to face the upstream room 24, while the downstream end thereof is open in the end surface of the plunger 22 opposite to the valve element 23 to face the downstream room 25.

Furthermore, in the valve case 13, a spring room 28 is formed to always communicate with the downstream room 25. In the spring room 28, a valve spring 29 for urging the plunger 22 in a direction of its seating on the valve seat 26 is accommodated in a contracted manner.

Moreover, in a portion of the valve case 13 around the plunger accommodating space 21, a solenoid coil 30 is mounted for moving the plunger 22 in a direction away from the valve seat 26 against the urging force of the valve spring 29 when excited by electric conduction. Normally, the solenoid coil 30 allows the plunger 22 to seat on the valve seat 26 by the urging force of the valve spring 29 and thereby put the shut-off valve 20 in its closed position. When electrically conducted, the solenoid valve 30 allows the plunger 22 to move away from the valve seat 26 and thereby put the shut-off valve 20 in its open position.

On the other hand, the regulator valve 31 includes a piston accommodating space 32 located inside of the valve case 13 and closer to the opening of the capsule 11. This piston accommodating space 32 is of double structure that has a bottomed cylindrical space and a second cylindrical space of substantially equal level extending concentrically from the bottom of the first cylindrical space. Inside of the piston accommodating space 32, a piston 33 is inserted for reciprocal motion as a valve body for opening and closing the high-pressure gas passage 18. Specifically, the piston 33 includes a piston body 34 placed in the second cylindrical space of the piston accommodating space 32, and a flange-like spring seat 35. The piston body 34 and the spring seat 35 divide the piston accommodating space 32 into three rooms: a pressure reducing room 37 of small diameter located upstream of the piston body 34 (on the right side in FIG. 1), a low-pressure room 38 reduced in pressure which is located downstream of the piston body 34 (on the left side in FIG. 1) and which has a larger diameter than the pressure reducing room 37, and a cylindrical spring room 39 having the same diameter as the low-pressure room 38. Furthermore, the spring room 39 is always communicated with the inner space of the capsule 11 through a communicating hole 17 formed through the valve case 13.

On the side surface of the pressure reducing room 37 closer to the bottom wall of the capsule 11 (on the shut-off valve 20 side), a valve seat 40 is formed in which is open a portion of the high-pressure gas passage 18 located upstream of the regulator valve 31. On the other hand, a portion of the piston body 34 closer to the capsule 11 bottom wall is formed into a valve element 36 having a smaller diameter than the other portions. The clearance between the valve element 36 and the valve seat 40 forms an orifice 41 to provide pressure reduction. Further, the middle portions of the piston body 34 and the spring seat 35 are formed with a communicating passage 42 for providing communication between the pressure reducing room 37 and the low-pressure room 38. The upstream end of the communicating passage 42 is open through the outer periphery of the valve element 36 to face the pressure reducing room 37, while the downstream end thereof is open in the end surface of the piston body 34 opposite to the valve element 36 to face the low-pressure room 38.

Furthermore, in the spring room 39, a valve spring 43 for urging the piston 33 in a direction of its movement away from the valve seat 40 is accommodated in a contracted manner. When the gas pressure in the downstream side of the regulator valve 31, more specifically, in its low-pressure room 38 (in turn in the low-pressure gas passage 19), is dropped below a predetermined pressure (for example, 1 MPa), the piston 33 is moved in a direction to open the regulator valve 31 by the urging force of the valve spring 43 to thereby put the valve in its open position, so that the high-pressure gas is taken into the low-pressure room 38 while being reduced in pressure by the orifice 41. On the other hand, when the gas pressure in the low-pressure room 38 is raised above the predetermined pressure, the piston 33 is moved in a direction to close the regulator valve 31 to thereby put the valve in its closed position, so that the pressure in the downstream side of the regulator valve 31 is held reduced down to the predetermined pressure.

In the gas inlet 2 of the high-pressure tank 1, a charging member (not shown) which contains a gas-charging check valve 45 and a safety valve 46 each of known structure is mounted in a manner to be screwed with the mounting thread 4 (it is to be noted that the check valve 45 and the safety valve 46 are symbolically shown). In charging the high-pressure gas into the tank 1, the check valve 45 is opened to prevent the gas in the tank 1 from going out of the tank 1. The safety valve 46 is normally closed. When the gas pressure in the tank 1 is excessively raised, however, the safety valve 46 is opened to release the high-pressure gas in the tank 1 to the outside of the tank 1. Such a safety valve 46 may also be provided on the bottom wall and/or the side wall of the capsule 11 in addition to the gas inlet 2, and may be opened so that the high-pressure gas in the tank 1 can be released through the capsule 11 to the outside of the tank 1.

Next, the operations of the present embodiment will be described. In the condition that the gas is not taken out from the high-pressure tank 1, the shut-off valve 20 of the valve mechanism 10 is in a closed position. In this condition, no electricity is conducted to the solenoid coil 30 so that the valve element 23 of the plunger 22 is seated on the valve seat 26 by the urging force of the valve spring 29. Accordingly, the high-pressure gas passage 18 in the valve case 13 is closed on its way, and therefore, the high-pressure gas in the tank 1 is not taken through the gas outlet 3 out of the tank 1.

In contrast, when the shut-off valve 20 is opened to take out the high-pressure gas in the tank 1, electricity is conducted to the solenoid coil 30 of the shut-off valve 20. As a result, the valve element 23 of the plunger 22 is moved away from the valve seat 26 against the urging force of the valve spring 29 by an electromagnetic force of the solenoid coil 30, and then makes the valve open. The opening of the shut-off valve 20 causes the high-pressure gas passage 18 to be opened, so that the high-pressure gas in the tank 1 flows through the high-pressure gas passage 18 into the regulator valve 31. In the regulator valve 31, when the gas pressure in the low-pressure room 38 is below the predetermined pressure (1 MPa), the piston 33 is moved in the direction to open the regulator valve 31 by the urging force of the valve spring 43 to thereby put the regulator valve 31 in an open position. Thus, the high-pressure gas flows through the low-pressure room 38 and the low-pressure gas passage 19 while being reduced in pressure by the orifice 41. On the other hand, when the gas pressure in the low-pressure room 38 is raised above the predetermined pressure, the piston 33 is moved in the direction to close the regulator valve 31 against the urging force of the valve spring 43 by the raised pressure to thereby put the regulator valve 31 in a closed position. Through this control of opening and closing of the regulator valve 31, the gas pressure in the downstream side of the valve is reduced to the predetermined pressure and the low-pressure gas thus reduced in pressure is discharged through the downstream end of the low-pressure gas passage 19.

Furthermore, in the present embodiment, the valve mechanism 10 as a combination of the shut-off valve 20 and the regulator valve 31 is provided at the gas outlet 3 of the high-pressure tank 1 to located inside of the tank 1, and its arrangement is of an in-tank structure. Therefore, the tank apparatus A need only be of the same size as the tank 1 itself, resulting in a downsized tank apparatus A.

Furthermore, since the valve mechanism 10 is located inside of the high-pressure tank 1, the valve mechanism 10 can be protected by the high-pressure tank 1 and can be therefore effectively prevented from hitting on nearby things and being damaged, for example, when the high-pressure tank apparatus A is carried somewhere. In addition, since low-pressure gas after pressure reduction through the valve mechanism 10 located inside of the high-pressure tank 1 is taken out of the tank, this eliminates the need for providing externally of the tank such a high-pressure sealing structure for preventing the leakage of high-pressure gas as required when the high-pressure gas is taken out of the tank as it is and then reduced in pressure, resulting in an enhanced handleability of the valve mechanism 10 and the like.

Furthermore, the valve mechanism 10 includes a capsule 11 fixedly attached to the gas outlet 3 of the tank 1 in a gas-tight manner to face the inside of the high-pressure tank 1, and the shut-off valve 20 and the regulator valve 31 are arranged within the capsule 11. Therefore, the inner space of the capsule 11 can be put under an atmospheric pressure like the outside of the tank 1 and accommodate the shut-off valve 20 and the regulator valve 31 with ease.

Moreover, since the high-pressure tank 1 includes a tank body 6 made of aluminium and a covering member 7 for covering the outer periphery of the tank body 6 for reinforcement, a light and compact high-pressure tank apparatus A can be obtained.

What is claimed is:

1. A high-pressure tank apparatus comprising:
   a high-pressure tank in which high-pressure gas is charged; and
   a valve mechanism provided at a gas outlet of the high-pressure tank to locate inside of the tank,
   the valve mechanism comprising
      a shut-off valve for providing and interrupting communication between the inside and outside of the tank by its opening and closing, respectively, and
      a reducing valve connected to the shut-off valve in series for reducing the pressure of the high-pressure gas in the tank.

2. The high-pressure tank apparatus of claim 1, wherein the valve mechanism includes a capsule fixedly attached to the gas outlet in a gas-tight manner to face the inside of the high-pressure tank, and the shut-off valve and the reducing valve are placed within the capsule.

3. The high-pressure tank apparatus of claim 1 or 2, wherein the high-pressure tank includes a tank body made of aluminium or resin, and a covering member for covering the outer periphery of the tank body for reinforcement.

4. The high-pressure tank apparatus of claim 1 or 2, wherein the gas pressure in the high-pressure tank is set at 7 MPa to 75 MPa.

5. The high-pressure tank apparatus of claim 3, wherein the gas pressure in the high-pressure tank is set at 7 MPa to 75 MPa.

6. The high-pressure tank apparatus of claim 1 or 2, wherein the gas is hydrogen gas.

7. The high-pressure tank apparatus of claim 1 or 2, wherein the gas is natural gas.

* * * * *